US011472726B2

(12) United States Patent
Norcross et al.

(10) Patent No.: US 11,472,726 B2
(45) Date of Patent: Oct. 18, 2022

(54) SEQUENCING BATCH REACTOR SYSTEMS AND METHODS

(71) Applicant: Evoqua Water Technologies LLC, Pittsburgh, PA (US)

(72) Inventors: Kenneth L. Norcross, Stilwell, KS (US); Nicholas A. Barczewski, Waukesha, WI (US); Patrick T. Kelly, Saint Francis, WI (US)

(73) Assignee: Evoqua Water Technologies LLC, Pittsburgh, PA (US)

( * ) Notice: Subject to any disclaimer, the term of this patent is extended or adjusted under 35 U.S.C. 154(b) by 34 days.

(21) Appl. No.: 17/050,040

(22) PCT Filed: Apr. 24, 2019

(86) PCT No.: PCT/US2019/028829
§ 371 (c)(1),
(2) Date: Oct. 23, 2020

(87) PCT Pub. No.: WO2019/209899
PCT Pub. Date: Oct. 31, 2019

(65) Prior Publication Data
US 2021/0094852 A1    Apr. 1, 2021

Related U.S. Application Data

(60) Provisional application No. 62/661,946, filed on Apr. 24, 2018.

(51) Int. Cl.
*C02F 3/12* (2006.01)
*C02F 3/00* (2006.01)

(52) U.S. Cl.
CPC ............ *C02F 3/1263* (2013.01); *C02F 3/006* (2013.01); *C02F 2203/002* (2013.01);
(Continued)

(58) Field of Classification Search
CPC .. C02F 3/006; C02F 2209/04; C02F 2209/22; C02F 3/1263; C02F 2209/40; C02F 2209/42
(Continued)

(56) References Cited

U.S. PATENT DOCUMENTS 6,383,389 B1 *  5/2002  Pilgram ................. C02F 3/006
                                                        210/98
2003/0111408 A1  6/2003  Austin et al.
(Continued)

FOREIGN PATENT DOCUMENTS

CN    106200381 A    12/2016
DE    19651578 A1     6/1998
(Continued)

OTHER PUBLICATIONS

Beyenbach, DE 102004024430, English machine translation, pp. 1-10 (Year: 2005).*
(Continued)

*Primary Examiner* — Claire A Norris (57) ABSTRACT

Methods of treating wastewater with a sequencing batch reactor are disclosed. The methods include determining an anticipated flow rate of the wastewater and independently operating one or more reactor in a continuous flow mode responsive to the anticipated flow rate. Sequencing batch reactor systems are also disclosed. The systems include a plurality of reactors operating in parallel, a loading subsystem, a measuring subsystem, and a controller. The controller can be configured to independently operate each of the reactors in a batch flow mode or in a continuous flow mode responsive to the anticipated flow rate. Methods of retrofitting existing sequencing batch reactor systems and methods of facilitating treatment of wastewater with sequencing batch reactor systems are also disclosed.

23 Claims, 5 Drawing Sheets

(52) U.S. Cl.
CPC .. *C02F 2209/001* (2013.01); *C02F 2209/006* (2013.01); *C02F 2209/03* (2013.01); *C02F 2209/04* (2013.01); *C02F 2209/22* (2013.01); *C02F 2209/40* (2013.01); *C02F 2209/42* (2013.01)

(58) Field of Classification Search
USPC .................................................. 210/614, 143
See application file for complete search history.

(56) References Cited

U.S. PATENT DOCUMENTS

| | | | |
|---|---|---|---|
| 2007/0119763 A1* | 5/2007 | Probst | C02F 1/24 210/198.1 |
| 2009/0014387 A1 | 1/2009 | Probst | |
| 2010/0243544 A1* | 9/2010 | Takemura | C02F 3/30 210/97 |
| 2012/0279919 A1 | 11/2012 | Atzmon | |
| 2013/0146535 A1* | 6/2013 | Albert | C02F 1/008 210/744 |
| 2014/0263040 A1 | 9/2014 | Smith | |
| 2015/0232358 A1 | 8/2015 | Connor et al. | |

FOREIGN PATENT DOCUMENTS

| | | |
|---|---|---|
| DE | 102004024430 A1 | 12/2005 |
| JP | 2006002401 A | 1/2006 |

OTHER PUBLICATIONS

Unknown, "Communication pursuant to Rules 70(2) and 70a(2) EPC", European Patent Application No. 19793091.0, dated Oct. 7, 2021, 1 page.
Fiocchi, Nicola, "Extended European Search Report", European Patent Application No. 19793091.0, dated Sep. 20, 2021, 9 pages.
Reddi, Anjaneyulu, "Examination report under sections 12 & 13 of the Patents Act, 1970 and the Patents Rules, 2003", Indian Patent Application No. 202017044096, dated Dec. 20, 2021, 6 pages.
"First Office Action", issued by the China National Intellectual Property Administration regarding related Chinese patent application No. 201980027945.3, dated Jun. 2, 2022, 26 pages.

* cited by examiner

SEQUENCING BATCH REACTOR SYSTEMS AND METHODS

CROSS-REFERENCE TO RELATED APPLICATIONS

This application claims the benefit under 35 U.S.C. § 119 of U.S. Patent Application No. 62/661,946, titled "SBR System," filed on Apr. 24, 2018, which is incorporated herein by reference in its entirety for all purposes.

FIELD OF TECHNOLOGY

Aspects and embodiments disclosed herein are directed toward systems and methods for the treatment of wastewater.

SUMMARY

In accordance with one aspect, there is provided a method of treating wastewater with a sequencing batch reactor system having a plurality of reactors arranged in parallel. The method may comprise operating the plurality of the reactors in a batch flow mode. The method may comprise determining an anticipated flow rate of the wastewater at an inlet of the reactors for a first period of time to be greater than a flow rate tolerated by a design hydraulic loading rate of the reactors. The method may comprise selecting one or more reactor as being in a state capable of receiving the wastewater in a continuous flow mode. The method may comprise operating the one or more selected reactor in the continuous flow mode, such that after a second period of time the plurality of the reactors are all operating in the continuous flow mode.

In some embodiments, the continuous flow mode may be associated with a hydraulic loading rate of about 25% to about 50% of a hydraulic loading rate associated with the batch flow mode.

The method may comprise selecting the one or more reactor based on a current cycle period of the reactor. The method may comprise selecting the one or more reactor when the current cycle period is one of fill, decant, and idle.

The method may comprise measuring one or more parameter for each reactor selected from available fill volume, influent water composition, process water composition, and hydraulic loading rate. The method may comprise selecting the one or more reactor responsive to the measured reactor parameter.

In certain embodiments, after the plurality of reactors are all operating in the continuous flow mode, the method may further comprise determining the anticipated flow rate of the wastewater at the inlet of the reactors for a third period of time to be within the flow rate tolerated by the design hydraulic loading rate of the reactors. The method may comprise selecting one or more reactor as being in a state capable of receiving wastewater in the batch flow mode. The method may comprise operating the one or more selected reactor in the batch flow mode, such that after a fourth period of time the plurality of the reactors are all operating in the batch flow mode.

In some embodiments, the continuous flow mode may include a transition period at an outset of the continuous flow mode, the transition period including react and settle cycle periods. An amount of time of the transition period may be sufficient to settle an effective amount of contaminants. The anticipated flow rate may be a flow rate expected after the amount of time of the transition period.

In some embodiments, an effective amount of aeration may be introduced into the one or more reactor during the continuous flow mode.

The method may comprise determining at least one flow rate parameter selected from expected rainfall, actual rainfall, expected sewerage flow rate, and actual sewerage flow rate. The method may comprise determining the anticipated flow rate responsive to the at least one flow rate parameter. In some embodiments, the expected rainfall may be determined responsive to at least one of a predicted weather event, time of day, time of year, and geographic location. In some embodiments, the expected sewerage flow rate may be determined responsive to at least one of a predicted sewerage event, time of day, time of year, and geographic location.

In accordance with another aspect, there is provided a sequencing batch reactor system. The system may comprise a plurality of reactors arranged in parallel, each of the reactors having an inlet fluidly connectable to a source of wastewater and an outlet. The system may comprise a loading subsystem configured to control a hydraulic loading rate of wastewater into each of the reactors through the inlet. The system may comprise a measuring subsystem configured to measure a parameter of each of the reactors and transmit an input signal corresponding to the measured parameter. The system may comprise a controller operably connected to the loading subsystem and the measuring subsystem. In some embodiments, the controller may be configured to receive and analyze the input signal and determine a state of each of the reactors. The controller may be further configured to transmit an output signal to the loading subsystem, the loading subsystem being configured to analyze the output signal to independently operate each of the reactors in a batch flow mode or in a continuous flow mode responsive to the state of each of the reactors and an anticipated flow rate of the wastewater.

In accordance with certain embodiments, the controller may be configured to transmit the output signal to operate one or more reactor in the continuous flow mode responsive to the anticipated flowrate of the wastewater being greater than a design hydraulic loading rate of the plurality of the reactors and the one or more reactor being in the state capable of receiving the wastewater in the continuous flow mode.

The controller may be configured to determine the anticipated flow rate responsive to at least one flow rate parameter selected from expected rainfall, actual rainfall, expected sewerage flow rate, and actual sewerage flow rate. In some embodiments, the controller may be operably connected to a rain sensor configured to transmit a measurement for the actual rainfall to the controller. The controller may be configured to determine the anticipated flow rate responsive to at least one of a predicted weather event, a predicted sewerage event, time of day, time of year, and geographic location. The controller may be programmable to recognize trends of the anticipated flow rate on a schedule and transmit the output signal responsive to the recognized trends.

In accordance with certain embodiments, the measuring subsystem may comprise one or more of a flow meter, a pressure sensor, an oxidation-reduction potential sensor, a dissolved oxygen sensor, and a level sensor. The controller may be configured to determine the state of each of the reactors based on at least one of available fill volume, influent water composition, process water composition, and hydraulic loading rate.

The system may further comprise an equalization tank having an inlet fluidly connected to the outlet of each of the reactors.

The system may further comprise at least one surge tank having an inlet fluidly connectable to the source of the wastewater and an outlet fluidly connected to the inlet of each of the reactors.

In some embodiments, each of the reactors may have a second inlet fluidly connectable to a source of oxygen. The controller may be configured to introduce an effective amount of aeration during the continuous flow mode.

In accordance with another aspect, there is provided a method of retrofitting a sequencing batch reactor system having a plurality of reactors arranged in parallel and configured to operate in a batch flow mode. The method may comprise providing a controller configured to transmit an output signal to operate one or more reactor in a continuous flow mode responsive to an anticipated flowrate of the wastewater being greater than a design hydraulic loading rate of the plurality of the reactors and the one or more reactor being in a state capable of receiving the wastewater in the continuous flow mode. The method may comprise operably connecting the controller to a loading subsystem of the sequencing batch reactor system configured to control a hydraulic loading rate of wastewater independently into each of the reactors.

In certain embodiments, the method may comprise operably connecting the controller to a measuring subsystem of the sequencing batch reactor system configured to measure a parameter of each of the reactors and transmit a first input signal to the controller to determine the state of each of the reactors.

The method may further comprise operably connecting the controller to an anticipated flow rate analyzer configured to transmit a second input signal to the controller to determine the anticipated flow rate.

In some embodiments, operably connecting the controller to the loading subsystem comprises operably connecting the controller to an input valve and an output valve of each of the reactors. The controller may be configured to independently control a loading rate of wastewater into each of the reactors and a decanting rate of water out of each of the reactors responsive to the first input signal wherein the parameter is process water composition.

In accordance with yet another aspect, there is provided a method facilitating treatment of wastewater with a sequencing batch reactor system having a plurality of reactors arranged in parallel and configured to operate in a batch flow mode. The method may comprise providing the sequencing batch reactor system. The method may comprise providing a controller configured to operate the plurality of the reactors in a batch flow mode; determine an anticipated flow rate of the wastewater at an inlet of the reactors for a first period of time to be greater than a flow rate tolerated by a design hydraulic loading rate of the reactors; select one or more reactor as being in a state capable of receiving the wastewater in a continuous flow mode; and operate the one or more selected reactor in the continuous flow mode, such that after a second period of time the plurality of the reactors are all operating in the continuous flow mode. The method may comprise operably connecting the controller to the sequencing batch reactor system to determine the state of each of the reactors and control a hydraulic loading rate of wastewater independently into each of the reactors. The method may comprise fluidly connecting an inlet of the sequencing batch reactor system to a source of the wastewater. The method may comprise instructing a user to operate the sequencing batch reactor system to treat the wastewater.

In accordance with certain embodiments, the method may further comprise providing an anticipated flow rate analyzer configured to determine the anticipated flow rate and operably connecting the controller to the anticipated flow rate analyzer.

The disclosure contemplates all combinations of any one or more of the foregoing aspects and/or embodiments, as well as combinations with any one or more of the embodiments set forth in the detailed description and any examples.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Typically, wastewater streams from municipal and industrial sources contain waste matter such as solids and soluble and insoluble organic and inorganic materials. These wastewater streams require decontamination to meet regulatory requirements before they enter the environment. Decontamination in wastewater treatment systems typically involves pretreatment, primary treatment, and secondary treatment. Pretreatment may involve equalization, neutralization, and insoluble organic contaminant removal. Primary treatment may involve screening or sedimentation systems and other methods to remove fine, medium, and large sized particles.

In some wastewater treatment systems, secondary treatment involves biological digestion or biological treatment. Specifically, biological wastewater treatment systems typically employ biomass with bacteria to digest biodegradable material in conventional sequencing batch flow treatment systems. These systems, frequently, aerate wastewater in the presence of the bacteria and subsequently clarify the liquid before discharge to the environment.

Systems and methods disclosed herein may be employed for treating waste material using a reactor or a series of reactors. The influent may be treated by controlling the metabolic activity of the microorganisms, for example, by monitoring the oxygen utilization rate or the potential oxygen utilization rate of the biomass so as to determine the required amount of oxygen to be supplied to the biomass.

In certain embodiments, a biological nutrient removal system with sludge-bulking control in a batch-activated sludge system may be employed. The activated sludge sewage treatment process may be received into a sewage treating basin in a first zone into which activated sludge is mixed and retained for a period sufficient to form a non-bulking sludge and absorb biodegradable dissolved compounds. The sludge may be aerated and subjected to a quiescent condition to permit settling of the sludge in a zone that has less than approximately 20% of the biochemical oxygen demand of the original sewage.

In most cases, these systems may be used to treat a normal flow of incoming wastewater. However, variations in flow conditions and contaminant concentration in the incoming wastewater streams, typically known as the influent or influent stream, periodically occur. Under normal conditions, wastewater flow varies because of ordinary fluctuations in household water use and discharge. However, rainstorms and other wet weather events draining into a wastewater collection system, in many instances, produce higher than normal wastewater flow. Storm surges, for example, may be associated with wastewater flows between 40 MGD and 100 MGD. Conventional systems may not be equipped to handle surges greater than about 50 MGD for a sustained period of time. Although these high flow situations occur infrequently, about 10 to 25% of the time on a yearly basis, wastewater treatment facilities must be flexible and accommodate such overflows.

The incidence of high flow situations may vary daily, seasonally, and/or by geographic region. Certain times of day or seasons of the year, for example, may typically be associated with a greater incidence of high flow situations. The incidence may also vary depending on geographic location, with certain areas being more prone to high flow situations than others. The systems and methods disclosed herein may take advantage of these patterns of high flow to adequately respond to an estimated or perceived high flow situation.

Wastewater treatment systems that respond to high flow rates may include an aeration reactor having two or more cells connected in series with a clarifier. When the flow rate of the incoming wastewater exceeds a selected level, incoming wastewater may flow into the second cell until the surge has subsided. The systems disclosed herein may comprise a surge tank positioned upstream from the sequencing batch reactors.

Systems disclosed herein for biologically treating wastewater may have a modified activated sludge process in at least two treatment cells hydraulically connected in series. The first cell may be a feed cell for incoming untreated wastewater and the last cell may be the discharge cell for settling of suspended solids. The last cell may have an element configured to transfer mixed liquor suspended solids and partially treated wastewater back to a prior treatment cell. Methods are disclosed involving feeding wastewater through a plurality of treatment cells hydraulically connected in series, aerating in at least one cell, settling of suspended solids from at least one treatment discharge cell, and transferring mixed liquor suspended solids back to at least one previous cell.

Systems and methods disclosed herein may involve the treatment of a sequencing batch reactor wherein wastewater, in quantities above a pre-selected minimum amount, may be proportionally aerated. For example, sequencing batch reactors may have volumetrically controlled withdrawals. A storm control procedure may be used to shorten cycle times according to the magnitude of the rate.

Some of the systems previously described differ from conventional sequencing batch flow treatment systems and consequently may require substantial capital costs compared to conventional sequencing batch flow treatment systems.

In accordance with certain embodiments, the systems and methods disclosed herein may relate to a wastewater treatment system having a flow control as described in U.S. Pat. No. 6,383,389, incorporated herein by reference in its entirety for all purposes. The wastewater treatment system may include a wastewater treatment apparatus fluidly connected to the influent system and have a pump and a valve.

The wastewater treatment system may also comprise a regulating apparatus controlling one of the pump and the valve and comprise a controller and an input apparatus for providing an input signal. The controller may analyze the input signal and generate an output signal configured for one of a batch flow mode and a continuous flow mode.

The systems and methods disclosed herein may include a controller for regulating a wastewater treatment system. The controller may be operatively connected to a sensor in the wastewater treatment system for receiving an input signal. The controller may further comprise a microprocessor for receiving and analyzing the input signal according to a logic program code and generating an output signal corresponding to one of a batch flow mode and a continuous flow mode. The controller may also be operatively connected an output apparatus for transmitting the output signal and actuating a valve to regulate a flow in the wastewater system in one of the batch and the continuous flow modes.

In another embodiment, the methods for treating a wastewater stream may comprise introducing the wastewater stream into a wastewater treatment system and measuring a parameter. The method may also comprise controlling the wastewater treatment system in one of a batch flow mode and a continuous flow mode according to the measured parameter.

In yet another embodiment, the methods for controlling a wastewater treatment system may comprise introducing a wastewater stream into the wastewater treatment system and transmitting a process signal corresponding to an operating condition in the wastewater treatment system. The method may further comprise analyzing the process signal and providing an output signal corresponding to one of a batch flow mode of operation and a continuous flow mode of operation according to a set of predetermined conditions. The method may also comprise actuating a valve based on the output signal.

Also disclosed is a method for controlling a wastewater treatment system comprising transmitting a process signal from the wastewater treatment system. The method may also comprise sequencing the periods of treatment of the wastewater treatment system in a batch flow mode during operation and sequencing the periods of treatment of the wastewater treatment system in a continuous flow mode during a revised operation. In this embodiment, the revised operation may be actuated responsive to a greater anticipated flow rate. In particular, the revised operation may be actuated responsive to an anticipated flow rate that is greater than a flow rate tolerated by the reactor. In some embodiments, the anticipated flow rate may be associated with a storm surge.

The wastewater treatment systems disclosed herein may be aerobic biological treatment systems using biomass to digest or degrade biodegradable materials in the influent stream. Further, the wastewater treatment systems may includes at least one controller for controlling at least one reactor with associated piping and pumping components.

In operation, the treatment system typically decontaminates the influent in a treatment cycle including series of steps or periods. These treatment steps may vary according a number of factors including, for example, influent flow rate, pollutant concentration and type, biomass concentration and diversity or type, ambient temperature, air flow, number of available reactors and other conditions such as downstream capacity and availability.

As used herein, "influent" defines a stream of "wastewater," from a municipal or industrial source, having pollutants or "biodegradable material," inorganic or organic compounds capable of being decomposed by bacteria, flowing into the wastewater treatment system. A "wastewater treatment apparatus" is a system, typically a biological treatment system, having a "biomass," a population of bacterial microorganisms or a diversity of types of bacteria, used to digest biodegradable material. Notably, the biomass requires an environment that provides the proper conditions for growth including nutrients.

"Digestion" refers to the biodegradation process where the biomass consumes the biodegradable material and reduces the biodegradable material to solid material which can be flocculated and removed by gravity sedimentation or settling into sludge. For example, in the biodegradation process, bacteria may use enzymes to hydrolyze or breakdown complex organic compounds, such as carbohydrates, into simple organic molecules, like carbon dioxide and water. During digestion, the bacteria may also reproduce which results in additional biomass. The settling process may also produce a substantially clear liquid layer above the settled sludge layer. Notably, the sludge may contain digested inorganic and organic materials and biomass.

Moreover, digestion may be under aerobic conditions wherein the biomass and the wastewater liquid mixes with oxygen. Alternatively, digestion may be under "anoxic" or anaerobic conditions, where no oxygen or air is added to the reactor. The latter is used to facilitate biodegradation of nitrogen containing compounds, such as nitrates.

In service, the wastewater treatment system predominantly operates and decontaminates as a batch flow treatment system, typically with at least one batch reactor (BRT) or sequencing batch reactor (SBR). During high flow incidences, the wastewater treatment system may operate and decontaminate as a continuous influent flow treatment system, typically as a continuous flow batch reactor (CFBRT).

The batch flow mode of operation typically includes cycles of filling, reacting or aerating, settling, decanting, and idle. The continuous flow mode of operation typically includes filling while at least one of aerating, mixing, settling, and decanting. When the wastewater treatment system operates or treats wastewater in the batch flow mode, the reactor in the wastewater treatment system performs treatment steps or periods on a batch quantity of influent contained in the reactor before discharge. In contrast, when the wastewater treatment system operates in the continuous flow mode, a continuous flow of influent enters the reactor while the reactor cycles through the treatment steps.

One drawback of systems operating exclusively in batch flow mode is the ability to handle increased influent flow rates. Batch flow systems typically have connections to storm water drains. When a storm event occurs the flow rate to the waste treatment facility can dramatically increase. The increase can be often two to five times the normal influent flow. If the treatment system cannot handle the increased flow, the excess flow is typically discharged to the environment untreated. This is an undesirable condition. The systems and methods disclosed herein involve sequencing batch reactor systems capable of adjusting operating parameters of the system in response to a high flow event. In particular, the systems and methods may be capable of adjusting operating parameters in response to an anticipated high flow event, with sufficient time to complete a transition cycle before the increased flow reaches the treatment system. Increased flow events may be associated with rainfall or increased sewerage flow rate.

As disclosed herein, the continuous flow mode may be associated with a hydraulic loading rate of between about 25% and about 50% of the hydraulic loading rate associated with a batch flow mode. During the continuous flow mode, wastewater may be dissipated across all reactors operating in continuous mode simultaneously. For systems that have between 2 and 4 reactors operating in continuous flow mode, the hydraulic flow of wastewater to each reactor may be reduced to about 50%, about 33%, or about 25% of the conventional batch mode reactor flow, respectively. Accordingly, reactors operating in continuous flow mode may be capable of treating high flow rate events.

In accordance with certain embodiments, the controller may regulate the wastewater treatment system, monitor the wastewater flow, monitor at least one parameter of the reactor, and determine the mode of operation. In certain embodiments, the controller may determine whether to switch operation of the wastewater treatment system from a batch flow mode to a continuous flow mode, and optionally back to a batch flow mode. In certain embodiments, methods of modifying or retrofitting an existing batch flow treatment system with minimal significant capital expenditure, are disclosed. The methods may provide a cost-effective upgrade solution for situations where such existing systems have insufficient treatment capacity.

Previous systems were equipped to switch from batch flow mode to continuous flow mode responsive to a measured flow rate at an inlet or within the system. At a low transition flow rate, such a design risks activation during routine transitory high flow periods, such as during the morning rush. At a high transition flow rate, such a design may not allow sufficient capacity or time for the system to transition to continuous flow mode without discharging inadequately treated water. To provide adequate treatment, the design requires an additional 20%-30% reactor volume, which is associated with high costs and makes retrofitting existing systems challenging and expensive.

The systems and methods disclosed herein involve switching from batch flow mode to continuous flow mode responsive to an anticipated flow rate at an inlet or within the system. In certain embodiments, the systems and methods assign activation of the transition to a plant operator so that the trigger is activated only when appropriate. In other methods, a controller may incorporated learned control to determine whether the anticipated flow rate will require a transition to the continuous flow mode.

The systems and methods disclosed herein also incorporate independent control of each reactor. The methods may employ a reactor-by-reactor transition decision which addresses the unique conditions in each reactor and controls the transition between modes as and when appropriate. These features may allow the operating mode switch to be activated only when an increased flow event, such as a storm, is expected. One benefit is that the transition can therefore be initiated early when influent flow rates are still relatively low and reactors have time to increase their spare capacity. The transition may also be performed infrequently so that the process advantages of batch mode operation are not lost. The systems and methods disclosed herein may additionally reduce or eliminate the incidence of discharging inadequately treated water due to a sudden influx of wastewater.

Figure 1:
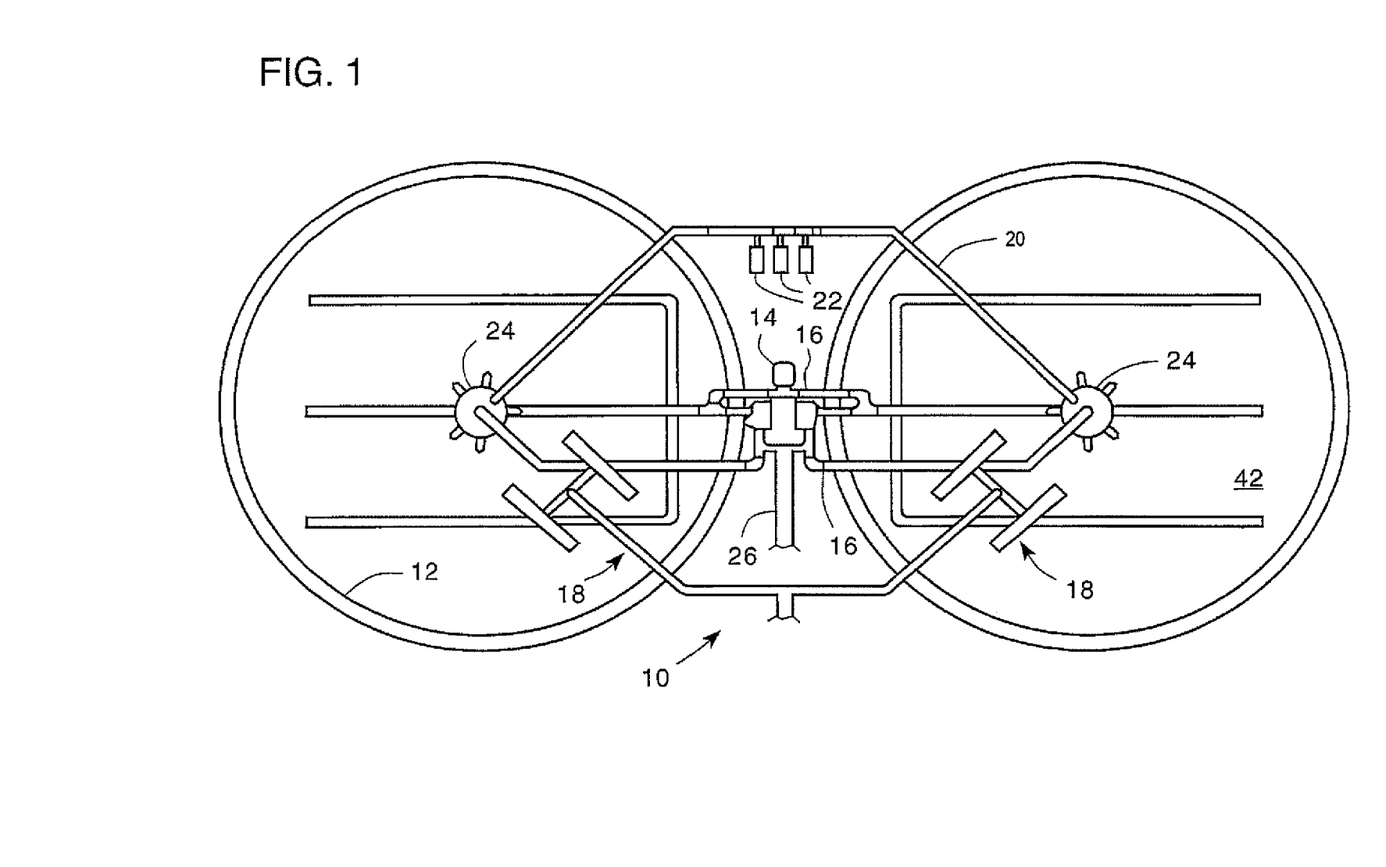
FIG. 1 is a top plan view of a wastewater treatment system, in accordance with one or more embodiments.

In accordance with certain embodiments, a wastewater treatment system 10 is shown in FIG. 1 with a reactor 12 and a pumping system with pump 14 connected to a piping manifold 16. Two reactors are shown in FIG. 1, however, the systems disclosed herein may include more reactors. Systems may include, for example, 2, 3, 4, 5, or 6 reactors. The wastewater treatment system 10 may be a sequencing batch reactor system. In some embodiments, each reactor may include an emergency float switch located near the full capacity liquid level of the reactor. For instance, the reactor may have an emergency float switch located about 1 ft from the top of the reactor. The reactor may have an emergency float switch located at a height which substantially corresponds to about 95% fill volume, about 90% fill volume, about 85% fill volume, or about 80% fill volume. A controller may be configured to shut the influent valve responsive to influent flow reaching the emergency float switch.

FIG. 1 shows each reactor associated with a decanting system 18, an aeration system with a conduit 20, an air source 22, a distribution structure 24 and a sludge conduit 26. The reactor may be fluidly connectable to a source of wastewater 28 (shown in FIG. 2). Wastewater, for example, from a municipal or industrial source, flows into the reactor through a filling system through the piping manifold 16 and a distribution conduit 30 (shown in FIG. 2) located near the bottom of reactor 12. In the sectional view of FIG. 2, piping manifold 16 includes at least one influent valve 32, for throttling and regulating the influent flow, conduits 34 and 36, fluidly connected to valve 32 and to distribution conduit 30. The filling system may include at least one baffle wall to dissipate any inlet turbulence. Influent valve 32 may provide flow control to reduce or prevent backflow. For example, influent valve 32 may be a check valve. In some embodiments, piping manifold 16 may include a pump or flow meter to provide flow control. The pump or flow meter may be configured to control influent flow equally or substantially equally to each tank.

Figure 3:
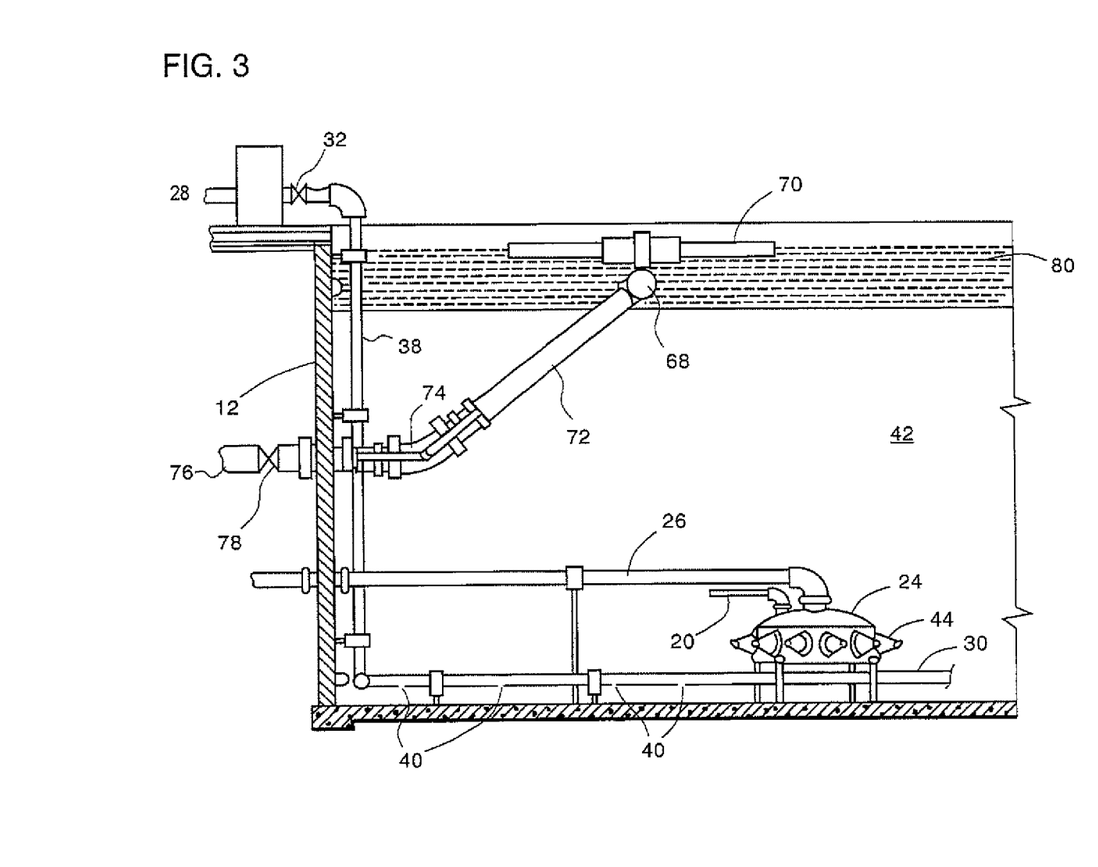
FIG. 3 is a cross-sectional side view taken along section line 3-3 of FIG. 1.

As shown in the cross-sectional view of FIG. 3, distribution conduit 30 connects to wastewater source 28 through a downcomer or riser 38. Each distribution conduit 30 may have a plurality of apertures 40 spaced along its length through which influent enters reactor 12 and joins with the liquid 42.

In another embodiment, the influent system may include at least one baffle wall. Also, the influent system may include a distribution system having at least one baffle wall that allows influent to enter reactor 12 without substantially disturbing liquid 42 or at least preventing any significant turbulence in liquid 42 that destroys anoxic conditions. The prevention of turbulence may be employed, for example, during the continuous flow mode. In certain embodiments, the distribution system may include a header fluidly connected to the plurality of reactors. The distribution system may include a flow splitter fluidly connected to the plurality of reactors. The header or flow splitter may include a baffle wall and be configured to distribute influent equally to the reactors and/or prevent backflow from the reactors. The header or flow splitter may be configured to prevent discharge of the influent into the decanter. In practice, the influent wastewater may flow up and over the reactor wall and into a baffle.

The wastewater treatment systems disclosed herein also may have an aeration system supplying air or oxygen to liquid 42. As shown in FIG. 1, the aeration system may have at least one distribution structure 24 connected to at least one air source 22 by conduit 20. Further, distribution structure 24, as shown in FIG. 2, has a number of nozzles 44 positioned around its perimeter through which air passes and contacts liquid 42.

The aeration system may be used as a mixing system by introducing air or liquid at a rate sufficient to create turbulence and effect mixing of liquid 42. Thus, in one embodiment air enters reactor 12 from air source 22 through nozzles 44 of distribution structure 24 at a rate that promotes mixing of liquid 42. In another embodiment, mixing of liquid 42 may be effected by withdrawing at least a portion of liquid 42 through, for example, apertures 40 along conduit 30, and introducing that withdrawn portion of liquid 42 through nozzles 44 of distribution structure 24 at a rate sufficient to create turbulence and mixing of liquid 42.

Figure 2:
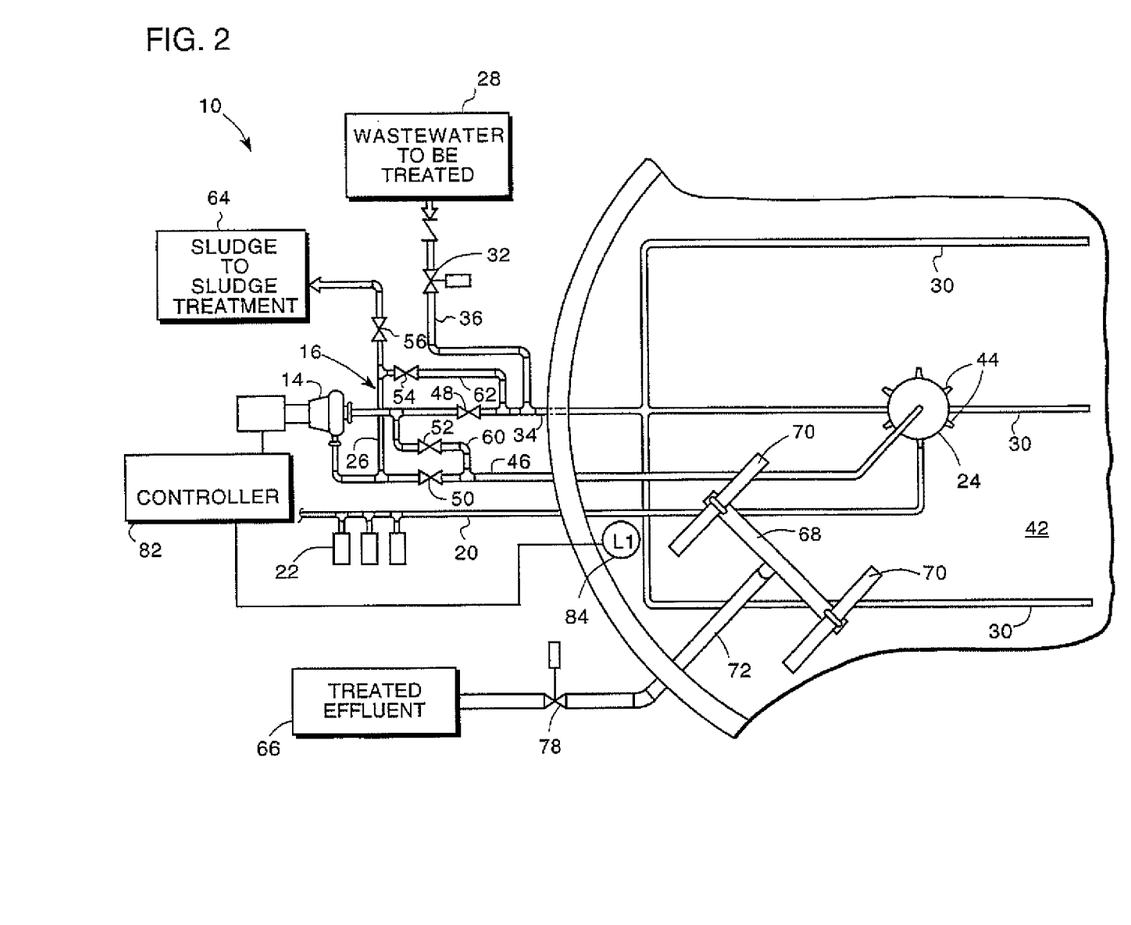
FIG. 2 is a sectional view of the wastewater treatment system of FIG. 1.

As shown in FIG. 2, the pumping system typically includes at least one pump 14 fluidly connected to manifold 16 to circulate, transfer or move fluid. Particularly illustrated in the embodiment of FIG. 2, pump 14 connects to conduits 26, 34 and 46 of manifold 16 through valves 48, 50, 52, 54 and 56. Additional connections in manifold 16 may include conduit 60 connecting conduit 46, downstream of valve 50, to conduit 34, between pump 14 and valve 48; and conduit 62 connecting conduit 34, between valve 48 and conduit 36, to conduit 26 before valve 56. Other similar connections in manifold 16 may be included to provide flexible operation and control of the wastewater treatment system. For example, additional connections may be provided to other reactors so that fluids may be transferred from one reactor to another.

In another embodiment, the wastewater treatment system further includes a sludge removal or withdrawal system for withdrawing or removing sludge or solids collected near the bottom of the reactor to a sludge treatment facility 64. For example, referring to the embodiment illustrated in FIG. 2, conduit 34 connects distribution conduit 30 to the inlet or suction side of pump 14 through valve 48. And, conduits 26 and 46 connect the pump discharge to the sludge treatment system 64 through valve 56. In this manner, the pumping system may be operated, in conjunction with proper valve alignment, to remove sludge from reactor 12.

In yet another embodiment, the wastewater treatment system may include at least one decanting system 18 for withdrawing a substantially clear layer near the top of the liquid 42 and discharging to effluent disposal 66. The embodiment of decanting system 18 shown in FIG. 1 includes at least one receiver apparatus 68, identified in FIG. 2, with at least one flotation apparatus 70. Flotation apparatus 70 provides sufficient buoyancy to the decanting system so that receiver apparatus 68 remains near the top surface of the liquid 42. Typically, receiver apparatus 68 withdraws a substantially clear layer of liquid 80, shown in FIG. 3. In the receiver apparatus, the liquid, as effluent, flows through conduits 72, 74 and 76 and discharges to effluent disposal 66 through effluent valve 78. In operation, the decanting system may transfer the top layer of liquid 42 without pumping assistance.

Alternatively, the decanting system may connect to piping manifold 16 and to the pumping system. In this arrangement, the suction side of pump 14 connects to the decanting system through at least one of conduits 72, 74 and 76. The discharge side of pump 14 then connects to the effluent disposal 66 through conduit 46 and effluent valve 78. Thus, the pumping system may be operated to assist the decanting system in transferring or removing the top layer of liquid 42.

A controller for supervising the treatment facility may be employed for optimal operation. The controller typically receives an input signal associated with the process conditions of each reactor in the wastewater treatment system and determines and analyzes the input signal to controls the reactors. The controller typically generates at least one output signal to direct, provide, and effectuate such control. In one embodiment, the controller determines an anticipated flow rate, compares that anticipated flow rate to a set-point associated with a design hydraulic loading rate of the reactor, and then directs operation of the wastewater treatment system according a batch or a continuous flow mode. The controller may additionally determine a state of the reactor when selecting one or more reactor to transition between the batch flow mode and the continuous flow mode. Further, the controller may be configured to be sufficiently flexible and adaptive to ignore transient or intermittent operating conditions in the treatment system. For example, the controller may be sufficiently adaptive to ignore transient spikes in influent flow measurements which do not immediately require a change in operating mode.

The design hydraulic loading rate of a reactor may refer to a maximum hydraulic loading rate tolerable by the reactor to produce effectively treated effluent. The design hydraulic loading rate may consider a flow rate of wastewater into the reactor and a flow rate of effluent out of the reactor.

The system as shown in FIG. 2 includes controller 82, which may be automated, providing at least one output signal to a loading subsystem which typically includes at least one output apparatus or device. For example, the output apparatus or device may be selected from one of the valves 32, 48, 50, 52, 54, 56 and 78. The loading subsystem may be configured to control a hydraulic loading rate of wastewater into each of the reactors through the inlet. The loading subsystem may be configured to control loading and decanting of the reactors. Controller 82 also may provide an output signal to pump 14 and air source 38. In another embodiment, the controller may include or be operatively connected to at least one of a radio or other type of wireless interface, a peer input and output serial and/or parallel port (I/O port), an internal real time clock and a process display capable of portraying and/or printing or recording the operational status of the wastewater treatment system. These peripheral components are typically included to accommodate flexible operation of the system and may provide for subsequent modifications.

The controller may operate automatically with one or more reactors in automatic mode and may allow for maintenance, equipment failure, or operator control. In particular, the controller may be operatively connected to an operator control module. The operator control module may be used to transmit an input signal for an anticipated flow rate or a state of a reactor. In practice, the operator control module may be a mobile or other electronic device, which signals the controller to transition at least one reactor between batch and continuous mode at the present time or at a predetermined future time. The controller may additionally transmit one or more output signal to the operator control module for notification of the status of the system. Such an embodiment may allow for monitoring and control of the system from a remote location. In certain embodiments, the controller may be configured to detect failure of critical equipment, such as influent valves, air sources, air valves, or decant systems. During such conditions, the controller may notify an operator and optionally automatically operate to remove the failed reactor, or the reactor associated with the failed equipment, from service and provide alarm or warnings accordingly.

In certain embodiments, the system includes a measuring subsystem including at least one input apparatus 84 operatively connected to controller 82. The measuring subsystem may be configured to measure a parameter of each of the reactors. The exemplary embodiment illustrated in FIG. 2 depicts a fluid level sensor or indicator providing an input signal to the controller 82. The level indicator typically transmits a 4 to 20 milliamp (mA) analog signal corresponding to a height or level of liquid 42 in reactor 12. An analog to digital converter (A/D converter) may convert that transmitted analog signal to a digital signal and transmit the digital signal to controller 82. However, other types of input apparatus, such as a flow meter, a pressure sensor, a composition analyzer, and a temperature indicator or an on/off-indication level sensor, may be connected to provide similar input signals, singly or in combination, to one of the A/D converter and controller 82. For example, the input apparatus may include a flow meter in conduit 36 measuring the influent flow rate, another flow meter in conduit 76 measuring the effluent flow rate, another flow meter in conduit 20 measuring the air flow rate, and a composition analyzer, such a chromatograph, in conduit 76 measuring the composition of the effluent. In an alternative embodiment, the input apparatus may be a keypad, or other man-machine-interface such as a computer with a keyboard and a graphical interface, which provides the operator of the treatment facility the capability to monitor, operate and control individual components of the treatment system. The input apparatus may be the operator control module having a graphical interface as described herein. For example, the interface may show the particular step in the treatment cycle for each reactor and the status of each valve in the treatment system as well as elapsed cycle time, elapsed step time and even set-points.

The output signal or signals from controller 82 may be a digital or analog signal directing at least one of valves 32, 48, 50, 52, 54, 56, 78, pump 14 and air source 38. Alternatively, controller 82 may send a digital output signal or signals to a digital to analog converter (D/A converter) to control any of the output apparatus. For example, controller 82 may generate a digital output signal which may then be converted to a 4 to 20 mA analog signal, or a 3 to 15 $lbf/in^2$ pneumatic analog signal, by the D/A converter. This analog signal may be sent to any of the valve or valve actuator or control center to throttle the valve or to energize the pump or air source. Notably, the connection between controller 82 any of the input or output apparatus may be by wire or may be wireless. In certain embodiments, the controller 82, and any of the input or output apparatuses, may be operatively connected through one or more servers and/or cloud-based systems.

Controller 82 may comprise at least one microprocessor, such as a PC, a timer/switch system, a programmable logic controller (PLC) or a distributed control system (DCS), having computational capability, at least one memory element, at least one display element, man-machine interface, program code and set-point or requirement, as known to one of ordinary skill in the art. The program code or program, described herein, may be comprised of logic elements such as ladder logic and may include the set-points that trigger changes in operation of the wastewater treatment system.

The wastewater treatment system may further comprise or be operably connectable to an anticipated flow rate analyzer. The anticipated flow rate analyzer may be configured to measure a flow rate parameter which may have an effect on the anticipated flow rate. In accordance with certain embodiments, the flow rate analyzer may include a flow meter or a rain sensor. The flow rate analyzer may be configured to transmit anticipated flow rate information to the controller. For example, the rain sensor may be configured to transmit actual rainfall information to the controller. The controller may receive an input signal of actual rainfall and determine that a surge of wastewater will imminently reach the wastewater treatment system. In accordance with certain embodiments, the rain sensor may be controller may be configured to transition from batch flow mode to continuous flow mode responsive to a rainfall of greater than about 2 in/hour. The controller may additionally consider one or more of a predicted weather event, a predicted sewerage event, time of day, time of year, and geographic location in determining the anticipated flow rate.

The wastewater treatment system may additionally or alternatively be fluidly connected to a pre-treatment subsystem or a post-treatment subsystem. The pre-treatment and post-treatment subsystems may utilize any water treatment methods conventionally known in the art. In accordance with certain non-limiting embodiments, the pre-treatment and/or post-treatment subsystems may comprise one or more of a screen filter, a membrane filter, a reverse osmosis unit, an ion exchange unit, an ultraviolet treatment unit, a chlorine dosing unit, a sand filter, and a primary or secondary treatment unit such as a clarifier or settling tank. The wastewater may be treated to remove bulk solids before treatment in the sequencing batch reactor system. The effluent may be treated to produce water of any desired quality, for example, potable water, deionized water, or ultrapure water, as known to one of skill in the art. The wastewater treatment system may additionally be fluidly connected to one or more equalization tank upstream or downstream from the reactors. The wastewater treatment system may additionally or alternatively be fluidly connected to one or more surge tank upstream from the reactors.

In operation, the wastewater treatment system may decontaminate influent in a batch flow mode or in a continuous flow mode. Specifically, the batch flow mode of operation treats the influent in batches so that each reactor performs treatment steps on a batch quantity of wastewater. In contrast, the continuous flow mode of operation treats a continuously flowing wastewater stream so that the reactors, singly, in series or in parallel, continuously accept influent while performing the treatment steps. Specific control of the wastewater treatment system, including specific control of the reactors in the wastewater treatment system in either the batch flow or continuous flow modes depend on several factors including, for example, liquid level, influent flow rate, contaminant concentration, ambient conditions and effluent flow rate.

Thus, in accordance with certain aspects, controller 82 may operate based on at least one transition set-point associated with an anticipated flow rate and a period of time, so that in operation when an anticipated flow rate falls below the transition set-point, controller 82 sequences the reactors in the batch flow mode. When the anticipated flow rate is determined to be at about or above the transition set-point for a predetermined period of time, controller 82 independently selects one or more reactors, depending on several factors including, for example, the particular treatment step at the switching instant, to begin transition to continuous flow mode. Conversely, when the anticipated flow rate is determined to fall below the transition set-point for a predetermined period of time, or other conditions become apparent which no longer require high flow capacity, controller 82 independently selects one or more reactors, depending on the same or similar factors, to begin transition from continuous flow mode to batch flow mode. The time factor may be considered to avoid false positive set-points. Namely, the time factor may be considered to avoid transition for transient events.

The controller may additionally or alternatively independently select a hydraulic loading rate for each reactor including, for example fill rate and/or decant rate. The hydraulic loading rate may be proportional to available fill volume in the reactor. In some embodiments, the controller may independently select fill rate for each reactor corresponding to wastewater flow rate and available fill volume.

In some embodiments, the controller may independently select decant rate for each reactor corresponding to wastewater flow rate, available fill volume, and remaining filled decant time. The decant rate may be selected so as to meet a desired bottom water level in the remaining filled decant time.

As mentioned, the batch flow mode may include treatment steps, such as, filling, aerating, mixing, reacting, quiescent settling, decanting, or idling. The sequencing and duration of these batch flow steps may be varied through the program by programmed control algorithms including, for example, fuzzy logic or artificial intelligence. The continuous flow mode may include treatment steps, such as, anoxic fill, aerated fill, filled settle, and filled decant. As with the batch flow mode, the sequencing and duration of these continuous flow steps may be varied by preprogrammed control algorithms including, for example, fuzzy logic or artificial intelligence. Moreover, the controller may operate based on a series of set-points corresponding, for example, to incremental influent conditions that trigger step-wise, or continuous, modification of each treatment step, in either the batch flow mode or continuous flow mode, so that the duration of one or more treatment step may be accordingly shortened or lengthened depending, for example, on the influent flow rate and effluent contaminant concentration.

Further, the controller may consider control loops that control or supervise components or subsystem of the wastewater treatment system. Specifically, individual control loops may involve any or a combination of proportional, integral or differential controls. These control loops may exist and operate independent of the program or may reside within the program. For example, the controller may operate based on control loops that control each reactor or each valve, pump or even step in each of the batch or continuous flow modes. These individual loops typically require specific tuning or adjustment according to any of control loop performance, valve performance and actuator performance.

The controller may implement programmed control algorithms including, for example, fuzzy logic or artificial intelligence, in determining the anticipated flow rate. In accordance with certain embodiments, the controller may be programmable to recognize trends of the anticipated flow rate on a schedule. The controller may consider parameters such as predicted weather events, predicted sewerage events, time of day, time of year, and geographic location in determining the anticipated flow rate. The controller may thus be capable of operating the wastewater treatment system responsive to the recognized trends.

The measuring subsystem may be include at least one input apparatus, for example, a sensor. In accordance with certain embodiments, the input apparatus may send an analog or digital input signal corresponding to the level of liquid 42 in the reactor. An A/D converter changes this analog signal to a digital signal according to a predetermined conversion factor. Controller 82 receives the input signal and calculates a liquid level and simultaneously compares the liquid level against the set-point or set-points. The controller 82 may convert the liquid level input signal to determine available reactor volume. In some embodiments, the controller 82 may receive an input signal through at least one I/O port.

During the batch flow mode, if, for example, the liquid level is at or above a set-point (more particularly, if the available volume is at or below a set-point), controller 82 may terminate the filling cycle for that filling reactor and divert influent flow to the next available reactor. Specifically, controller 82 sends an output signal, typically a digital output signal that corresponds to actuating at least valve 32. This output signal may be sent through an I/O port to a D/A converter. The D/A converter my change the digital output signal to a 4 to 20 mA current in a 12 or 24 volt analog circuit or to a 3 to 15 lbf/in$^2$ pneumatic actuation signal. The output apparatus, valve or the actuator of valve 32 in this example, receives the analog output signal and reacts accordingly. Similar output signals may be generated by controller 82 for other output apparatus. At the end of the filling step, controller 82 may prepare the reactor for the next step.

During a transition to continuous flow mode, or upon receiving an indication that the anticipated flow rate is above a set-point, the controller 82 may receive an input signal from the measuring subsystem corresponding to a level of liquid 42 in one or more of the reactors. The controller 82 may determine the liquid level and available volume and compare the values against the set-point or set-points. If the liquid level is at or below a set-point (more particularly, if the available volume is at or above a set-point), controller 82 may begin transition for the given reactor from batch flow mode to continuous flow mode. The controller may independently select a reactor for transition responsive to an independent transition calculus performed for each reactor. A transition period which provides for adequate treatment of the liquid 42 within the reactor at that time may be initiated. After completion of the transition period, or after adequate treatment of the liquid 42, the controller 82 may send an output signal that corresponds to at least one effluent valve to begin continuous flow mode treatment. Upon selecting one or more reactor to transition to continuous flow mode, the controller 82 may send an output signal to distribute wastewater substantially evenly to all reactors transitioning to continuous flow mode.

If any one or more reactor has a liquid level at or above a set point (more particularly, if the available volume is below a set-point), controller 82 may continue treatment in the batch flow mode and select a time point in the future to re-evaluate liquid level of the given reactor. The controller 82 may generally continue to evaluate the reactors for transition to continuous flow mode until all reactors have met the set-point and been instructed to transition. Notably, controller 82, or the A/D converter, may sample or otherwise determine the liquid level at predetermined fixed or variable intervals. For example, the liquid level may be sampled or calculated once every millisecond or every second or only after a predetermined filling time has elapsed. In this manner, controller 82 may be optimized so to reduce its computational duties.

One or more other measurements may be considered, in addition to or instead of fill level, when selecting a reactor to transition between batch and continuous flow mode. For example, the controller 82 may receive an input signal from any input apparatus in the measuring subsystem, as previously described. The measuring subsystem may comprise one or more of a flow meter, a pressure sensor, an oxidation-reduction potential sensor, and a dissolved oxygen sensor. The controller 82 may consider reactor fill level and/or reactor available volume in connection with current reactor treatment cycle, influent water composition, process water composition, and hydraulic loading rate. As described herein, reactor treatment cycle refers to a batch flow mode treatment step. The controller 82 may select one or more reactor being in a current treatment cycle period of fill, decant, or idle. As described herein, hydraulic loading rate may refer to a fill and/or decant flow rate of the reactor.

In certain embodiments, as in the filling step of the batch flow mode, and referring back to FIG. 1, influent typically flows into at least one reactor through conduit 36, downcomer 38 and through apertures 40 of distribution conduit 30. In an alternative arrangement, pump 14 withdraws influent and drives the influent to distribution conduit 30 or distribution structure 24. Referring to FIG. 2, the specific valve arrangement for such flow configuration requires valves 32, 48 and 50 to be open while all other valves to be closed. As mentioned, the wastewater treatment system may be controlled according to a predetermined or programmed instruction. In an embodiment, controller 82 sends at least one output signal to valve or the actuator of valves 32, 48 and 50 to open or allow a desired flow through these valves. Simultaneously, controller 82 also sends output signals to valve or the actuators of valves 52, 54, 56, and 78 to close these valves and prevent fluid flow. Notably, filling may be performed with or without mixing or turbulence in the liquid. In particular, anoxic filling, may generally be employed such that operation promotes distribution of influent without disruption of settled solids and helps control diversity or selectivity of biomass population.

Another next step in the batch flow mode may involve mixing the liquid in the filled reactor. This step need not necessarily follow the filling step and may, in some cycles, overlap with other steps or may be eliminated. For example, this step may occur with the aerating step. This step may involve withdrawing a portion of the liquid through distribution conduit 30. In one embodiment, liquid flows into the reactor through piping manifold 16 and distribution structure 24. In such configuration, for example, valves 48 and 50 are open and valves 32, 52, 54, 56 and 78 are closed. Thus, controller 82 sends output signals to allow a desired flow through valves 48 and 50 and to the control center to energize pump 14. Controller 82 may also send output signals to close valves 32, 52, 54, 56 and 78.

Another step in the batch flow mode may include aeration of liquid 42 to promote biodigestion or degradation. In the aerating step, a source of oxygen may oxygenate the liquid and the biomass to promote biological activity and digestion of biodegradable material. The source of oxygen may provide air, oxygen, or ozone. The source of oxygen, for example, air source 22, supplies air to distribution structure 24. Air leaves distribution structure 24 through nozzles 44 and contacts biomass in liquid 42. Aeration generally provides oxygen to the biomass to promote bioactivity and may promote, in some cases, mixing of the liquid and the biomass. Aeration may commence as early as the latter stage of the filling step but need not necessarily immediately follow the filling step. Aeration, in another embodiment, may continue or overlap with the sludge removal step so that liquid withdrawn from conduit 30 mixes with air from source 22. In another embodiment, controller 82 regulates aeration by activating air source 22 so that air becomes sufficiently pressurized to overcome the head pressure exerted by liquid 42 on distribution structure 24 thus forcing air to flow and bubble out through nozzles 44. An air valve (not shown) may also be controlled by controller 82 so that air flowing through conduit 20 may be regulated.

In the settling step, or quiescent settling of the batch flow mode, aeration may be terminated and the biomass, digested materials, and solids are allowed to settle. The settling step typically involves minimal or no liquid flow, entering or leaving the reactor. The settling step typically stratifies the liquid so that solids settle near the bottom, and a substantially clear layer, near the top of liquid 42, forms above the settled solids.

The decanting step withdraws the layer of substantially clear liquid 80, or liquid nearly free of solids, from the upper portion of the liquid in the reactor, through the decanting system. Substantially clear liquid flows into receiver apparatus 68, through conduits 72, 74, and 76, and discharges to effluent disposal 66 through effluent valve 78. If the pumping system also connects to the decanting system, the suction side of pump 14 receives fluid from receiver apparatus 68 and through at least one of conduits 72, 74 and 76. The discharge side of pump 14 discharges to effluent disposal 66. In some embodiments, controller 82 opens at least one of valve 78 and pump 14 and closes at least one of valves 32, 48, 50, 52, 54 and 56.

As with the decanting step, the sludge removal step of the batch flow mode typically, but not necessarily, follows settling. Notably, sludge removal may continue into the treatment step following settling or may proceed with the decanting step. In the sludge removal step, an amount of sludge, essentially settled solids, may be withdrawn from the reactor when pump 14 draws in the sludge near the bottom of the reactor through apertures 40 of conduit 30. Pump 14 discharges the sludge to sludge treatment 64 through conduit 26. In some embodiments, controller 82 generates output signals to open valves 48 and 56 and close valves 32, 50, 52 and 54.

The batch flow mode may further include an idle step wherein significantly all systems remain idle. Ordinarily, the duration of this step varies according to influent conditions so that as the influent rate increases, idle time decreases. However, this step need not necessarily exclusively vary depending on the influent conditions. For example, any of the other batch flow mode steps may be varied proportionally according to operating conditions or as determined by the operator.

At the outset of the continuous flow mode, the reactor may go through a transition period. Typically, during the transition from batch flow mode to continuous flow mode, one or more treatment step is performed to prime the reactor for continuous flow mode operation. For instance, if the reactor is partially full of treatment fluid from a batch flow mode, the fill volume may not be sufficiently treated for discharge. The reactor may undergo one or more treatment step selected from, for example, a react cycle and a settle cycle, before decanting any treated fluid. The react cycle may include one or more of mixing and aerating steps. The additional treatment steps may be performed while the reactor is filling or idle, but prior to decanting. In accordance with certain embodiments, the time for the transition period treatment step may correspond to the current fill volume, similar to a variable time cycle.

In certain embodiments, the transition period to continuous flow mode may take between about 30 mins and 90 minutes. The transition period may take, for example, about 30 minutes, about 45 minutes, about 60 minutes, about 75 minutes, or about 90 minutes. The transition period time may depend on the process water composition and fill volume of the reactor at the transition time. In general, the transition period may be sufficient to settle an effective amount of contaminants, such that operation during the continuous flow mode produces a sufficiently treated effluent. In certain embodiments, the anticipated flow rate may be a flow rate expected after the amount of time of the transition period. The controller 82 may determine the amount of time of the transition period for each reactor and begin the transition accordingly such that the anticipated flow rate becomes an actual flow rate after the transition period has been completed.

After the transition period, controller 82 may monitor the influent flow rate as measured by input apparatus 84 and generally sequence the valves and pumps of the wastewater treatment system according to the corresponding treatment step. Specifically, as with the batch flow mode, controller 82 may generate output signals during each step of the continuous flow mode to actuate, throttle, or close any of the valves, pump, and air source to regulate fluid through the wastewater treatment system. In the continuous flow mode, the wastewater treatment system may include at least one of a filling while aerating (aerated fill), mixing, settling (filled settle), and decanting (filled decant). Aeration may be introduced into the one or more reactor during the continuous flow mode in an effective amount to treat the wastewater. In general, the effective amount of aeration during the continuous flow mode may be less than the aeration during the batch flow mode. Additionally, the reduced flow rate associated with the continuous flow mode may allow a substantially simultaneous fill and decant while maintaining adequate treatment. In particular, during fill or during anoxic fill, which may continue during the filled settle and filled decant steps, influent may flow through piping manifold 36 and out through apertures 40 of conduit 30. In another embodiment, controller 82 may actuate valves (not shown) controlling flow through each arm of conduit 30 to prevent short-circuiting of bypassing, where no or minimal digestion of influent occurs because it flows almost directly into the decanting system.

The aerated fill step allows biodigestion. Aeration during filling may continue from anoxic filling until the liquid level reaches the maximum level. At that point, filled settle may begin. In this step, controller 82 typically continues to monitor the level of liquid 42, through level indicator 84, while controlling and sending output signals. Additionally, controller 82 may send output signals to air source 22 or an air valve (not shown) in conduit 20 to throttle or regulate airflow through distribution structure 24. Controller 82 may also send output signals to close at least one of valves 48, 50, 52, 54, 56, and to de-energize pump 14.

The filled settle step typically follows the aerated fill step. The filled settle step permits settling of the biomass solids before the filled decant step and is substantially similar to the settling step of the batch flow mode. In particularly, controller 82 may send output signals to close all valves except for influent valve 32 which may be throttled to reduce the influent flow rate so as to minimize turbulence and disturbance of the settling process.

The filled decant step may involve withdrawal of the upper portion of the liquid through the decanting system. This step is also similar to the corresponding batch flow mode decanting step. Thus, controller 82 may generate corresponding output signals to open or close the corresponding valves to allow removal of the substantially clear liquid above liquid 42. In other embodiments, the continuous flow mode further includes a sludge removal step during filling. This step, typically but not necessarily, follows the filled settle step. This step is also similar to the corresponding batch flow mode sludge removal step and thus, controller 82 would generate corresponding output signals to actuate the corresponding valves to allow sludge removal to sludge treatment 64.

During a transition period between a continuous flow mode and a batch flow mode the reactor may be primed for batch flow mode operation as previously described for the transition to continuous flow mode. Typically, during the transition from continuous flow mode to batch flow mode, one or more treatment step is performed to prime the reactor for batch flow mode operation. The transition period to batch flow mode may generally be shorter than described above with respect to continuous flow mode. For instance, the transition to batch flow mode may take between about 10 minutes and about 60 minutes. In particular, due to the increased flow rate of batch flow mode, the controller 82 may consider fill volume of the reactor when selecting the one or more reactor as being in a state capable of transitioning to batch flow mode. The controller 82 may consider a treatment step when selecting the one or more reactor as being in a state capable of transitioning to batch flow mode. For instance, in some embodiments the controller 82 may transition one or more reactor currently in filled settle or filled decant steps. An effective amount of effluent may be decanted prior to beginning the fill step of the batch flow mode.

In accordance with one aspect, one or more reactor may be transitioned from a batch flow mode to a modified batch flow mode, in a manner similar to any of the methods described herein for transitioning to a continuous flow mode. The modified batch flow mode may incorporate one or more cycle from the batch flow mode, while operating a substantially continuous flow mode. For instance, the system may distribute wastewater substantially evenly to all reactors operating in the modified batch flow mode. The reduced flow rate may allow aerated fill and/or mix. One or more of settle and decant may be performed without filling, as in a batch flow mode. The modified batch operation may avoid simultaneous decant by more than one reactor. The modified batch mode may tolerate a greater overall flow rate and produce effluent of a quality similar to batch flow mode operation.

Figure 4:
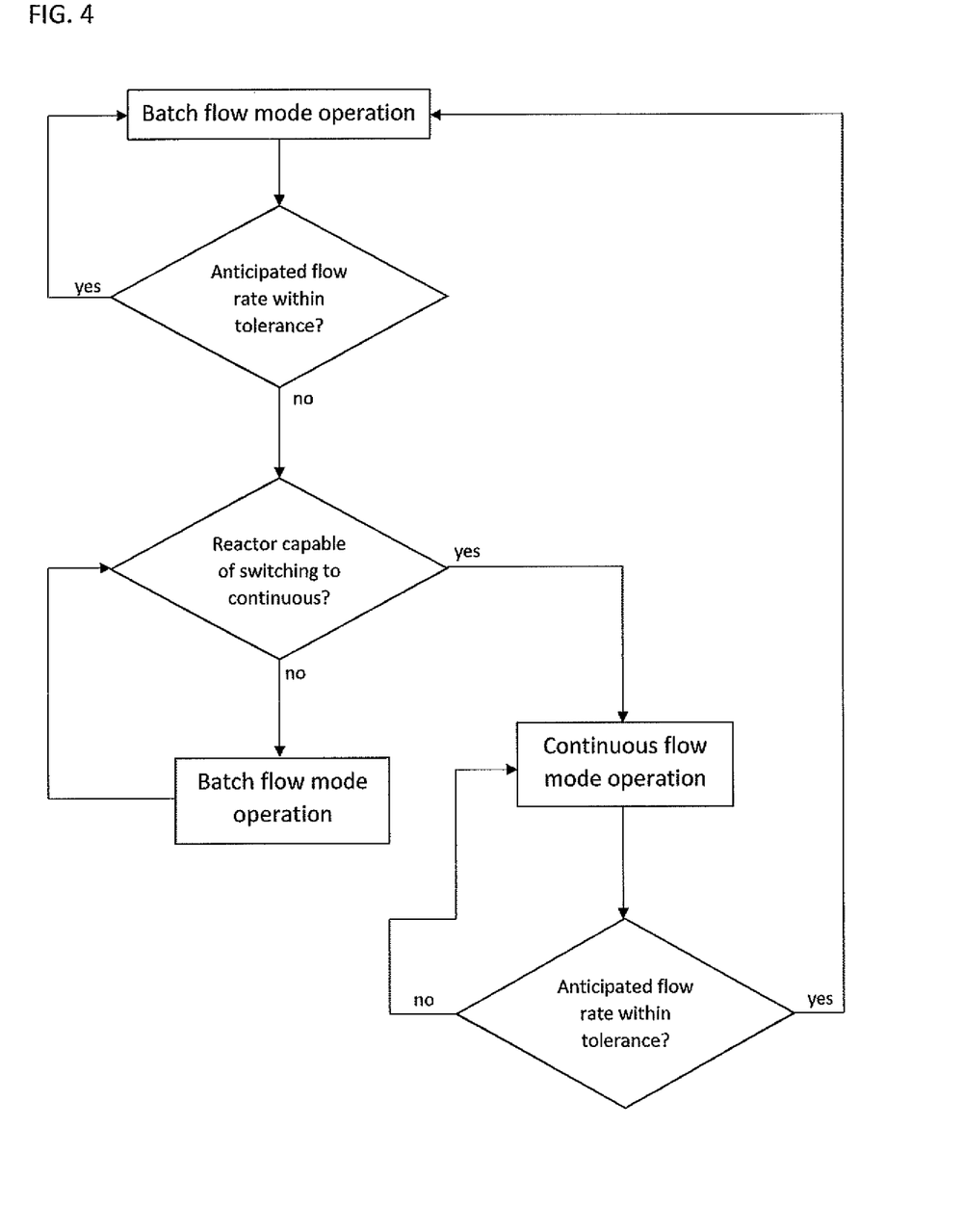
FIG. 4 is flowchart showing of a control scheme which can be implemented by a controller in accordance with one or more embodiments.

FIG. 4 is flowchart showing of a control scheme which can be implemented by controller 82. As shown in FIG. 4, the wastewater treatment ordinarily operates in a batch flow mode. The controller 82 may consider input signals to determine whether an anticipated flow rate is within tolerance of the hydraulic loading rate of the reactors. The controller may consider flow rate parameters selected from expected rainfall, actual rainfall, expected sewerage flow rate, and actual sewerage flow rate to determine the anticipated flow rate. If the anticipated flow rate is within tolerance, the system continues operation in the batch flow mode.

If the controller 82 determines the anticipated flow rate is greater than a tolerance of the reactor, the controller 82 may transmit an output signal to one or more reactor. The controller 82 may consider whether each reactor independently is in a state capable of receiving wastewater in a continuous flow mode. To determine the state of the reactor, the controller 82 may receive an input signal selected from available fill volume, influent water composition, process water composition, and hydraulic loading rate of the reactor. The controller 82 may additionally or alternatively consider the current cycle period of the reactor and/or the time remaining for the current cycle period. The controller 82 may additionally consider the type of cycle, for example, fixed time cycle or variable time cycle. If the controller 82 determines the reactor is in a state capable of receiving wastewater in the continuous flow mode, the controller 82 may transmit an output signal instructing the reactor to transition to the continuous flow mode. If the controller 82 determines the reactor is not in a state capable of receiving wastewater in the continuous flow mode the controller 82 may wait a period of time and re-evaluate the reactor. The controller 82 may generally make the determination for each reactor independently and transition each reactor independently.

Once the reactor is operating in the continuous flow mode, the controller 82 may periodically re-evaluate the anticipated flow rate, as previously described. If the anticipated flow rate falls within tolerance, the controller 82 may transition the reactor to batch flow mode. In accordance with certain embodiments, if the anticipated flow rate falls within tolerance, the controller 82 may evaluate each reactor independently to determine if the reactor is in a state capable of receiving wastewater in the batch flow mode and transition each reactor independently, as previously described. If the anticipated flow rate is greater than the tolerance, the controller 82 may continue to operate the system in the continuous flow mode.

When operating in any flow mode, the systems and methods disclosed herein may employ fixed time cycles or variable time cycles. Fixed time cycles typically run independent of reactor fill level. For instance, a full operating time may be used in times of low influent flow rate. Variable time cycles typically run in correspondence with reactor fill level. In such embodiments, cycle operating time may be modified to correspond with the fill volume. For instance, in times of low influent flow rate, one or more operating cycles may run for a fraction of the time, corresponding to the influent flow rate and/or fill volume. In certain embodiments, the amount of aeration may similarly be modified to correspond with the fill volume. In accordance with one exemplary embodiment, the batch flow mode and transition period may operate according to a variable time cycle and the continuous flow mode may operate according to a fixed time cycle. The controller may be configured to receive an input signal for the influent flow rate and/or fill volume and transmit an output signal for the cycle operating time.

Methods disclosed herein may additionally comprise providing one or more component of the system and, optionally, interconnecting the components to be operable as previously described. In accordance with certain embodiments, methods of retrofitting an existing wastewater treatment system may comprise providing a controller to operate the wastewater treatment system as disclosed herein. Methods of retrofitting may additionally comprise providing a component of the measuring subsystem and operably connecting the component to the controller. In some embodiments, methods of retrofitting may comprise providing a component to reduce or prevent backflow from one or more reactor while operating in the continuous flow mode. For instance, methods of retrofitting may comprise providing and/or installing one or more of a check valve, flow control valve, flow meter, inlet pump, distribution system, header, flow splitter, and/or inlet baffle configured to reduce or prevent backflow as previously described.

Methods of facilitating treatment of wastewater may additionally comprise providing the wastewater treatment system. The methods may further comprise instructing a user to operate the wastewater treatment system to treat wastewater, as previously described.

Methods of controlling wastewater treatment may comprise introducing wastewater into a wastewater treatment system. The methods may comprise analyzing an operating condition for each of the reactors and transmitting a plurality of input signals, each corresponding to an operating condition of the plurality of the reactors. The methods may further comprise determining an anticipated flow rate and transmitting an input signal corresponding to the anticipated flow rate. The methods may comprise analyzing the plurality of input signals corresponding to the reactor operating conditions and the input signal corresponding to the anticipated flow rate. The methods may further comprising providing an output signal corresponding to one of a batch flow mode and a continuous flow mode responsive to the analysis of the input signals. The methods may comprise transitioning one or more reactor to an alternate mode responsive to the output signal. The phraseology and terminology used herein is for the purpose of description and should not be regarded as limiting. As used herein, the term "plurality" refers to two or more items or components. The terms "comprising," "including," "carrying," "having," "containing," and "involving," whether in the written description or the claims and the like, are open-ended terms, i.e., to mean "including but not limited to." Thus, the use of such terms is meant to encompass the items listed thereafter, and equivalents thereof, as well as additional items. Only the transitional phrases "consisting of" and "consisting essentially of" are closed or semi-closed transitional phrases, respectively, with respect to the claims. Use of ordinal terms such as "first," "second," "third," and the like in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

EXAMPLE

The embodiments may be further understood with reference to the following examples. The examples are intended to serve as an illustration and are not limiting.

Simplistic Operation Control

Traditionally, it is understood that batch mode operation produces better effluent quality, nutrient removal, and settling of microbes than continuous-fill systems due to the process kinetics and hydraulics involved, except at higher flow rates which are typical of rain storms (for example, between 22 MGD and 60 MGD). The systems disclosed herein allow batch-mode systems to switch modes to a continuous-fill operation at high flow rates, then switch back to batch-mode when the rainwater subsides.

However, the systems disclosed herein incorporated independent control of each reactor. A simplistic process operational response to a specific input, namely, operation of all reactors in batch mode at normal flows and a complete switch to continuous-fill mode operation for high storm flows, then back again after the flows subside, would require a greater tank volume. The simplistic operation necessarily imposes a demand on the total batch reactor treatment system for significant additional volumetric capacity, compared to a dedicated batch system, in order to avoid process treatment failure.

An exemplary four-reactor batch reactor system, as summarized in Table 1, operates in the simplistic model.

TABLE 1

| Municipal Wastewater Treatment System Design Criteria | |
|---|---|
| Average Flow | 11 MGD |
| Peak Flow | 44 MGD |
| Peak Instantaneous Flow | 60 MGD |
| Influent BOD | 234 mg/l |
| Influent Suspended Solids | 234 mg/l |
| Effluent Suspended Solids | 30 mg/l |
| Influent Phosphorus | 6.0 mg/l |
| Wastewater Temperature | 12-23° C. |

The system additionally has a 21-hour hydraulic retention time at the average daily flow rate of 11 million gallons (MGD), a total reactor volume of 9.6 MG, or 2.4 MG each, and a bottom water level of 14 ft, a top water depth of 18 ft, and 2 feet of freeboard (distance between the top water level and the top of the reactor wall) for a wall height of 20 ft. Each tank includes an emergency float switch located one foot below the top of the wall at 19 ft. This is a provision to avoid flooding a tank, which automatically opens the effluent discharge system (decanter) if that float is lifted.

Figure 5:
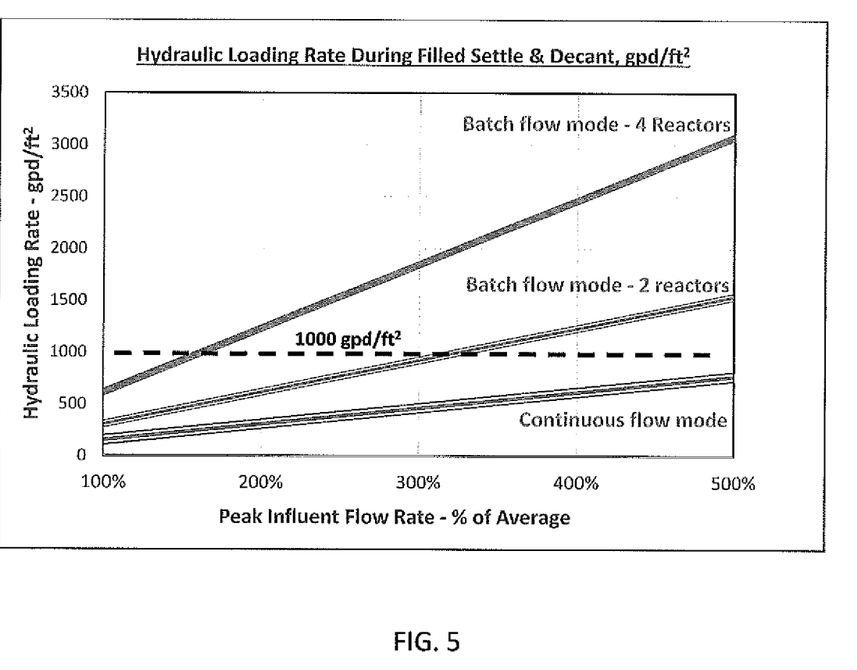
FIG. 5 is a graph of tolerated hydraulic loading rate for batch flow mode reactors and continuous flow mode reactors.

The graph of FIG. 5 shows the hydraulic loading rate, the amount of influent wastewater that flows into a reactor at a given multiple of the average design rate, in the typical units of gallons per day per square foot of reactor floor, for a batch-fill system of 4 reactors, a batch fill system of 2 reactors, and a continuous-fill system. This hydraulic loading rate value gives a rough idea of the upward velocity of the water as it flows into and through a reactor. The greater the upward velocity, the more likely it is to carry settling solids up to the effluent decanter and out of the reactor, an undesirable situation.

In the exemplary embodiment, the average daily flow rate of 11 MGD is indicated on the horizontal axis of the graph of FIG. 5 as a peak influent flow rate of 100% of design. The peak flow rate of 44 MGD corresponds to about 400%. The hydraulic loading rate of 1000 gpd/ft$^2$ is indicated with the dashed line. This loading rate is commonly associated with poor separation of biosolids from clarified effluent water. Thus, it can generally be said that operation at a rate below the dashed line on FIG. 5 is safe, and operation above the line is problematic. If the four-tank example is operated in batch fill mode, the hydraulic loading rate of 1000 gpd/ft$^2$ is exceeded at 150% of the design flow rate, corresponding to 16.5 MGD. By the time the system receives the peak influent flow rate of 44 MGD (400% of average) the hydraulic loading rate is 250% of the safe operational limit of 1000 gpd/ft$^2$, and seriously degraded effluent quality can be expected. These conditions often cause batch reactors to discharge unsatisfactory effluent containing suspended solids that were carried up to the effluent decanters by the sheer volume of rain flowing into that one reactor. At 2500 gpd/ft$^2$ the nominal upward velocity of the influent in one reactor is 14 ft/hr, whereas the settling velocity of typical biosolids is less than 33% of that rate.

Comparatively, in a continuous-fill operation under these same conditions the system operates at less than the 1000 gpd/ft$^2$ range even at the peak instantaneous flow of 60 MGD (corresponding to 545% of average) since the flow rate is distributed to all four reactors, with resultant upflow velocities well within the range of most biosolids.

In the exemplary simplistic model system, a flow rate of 200% the average, or 22 MGD, operating exclusively at continuous-fill mode results in all four tanks having a fill rate of 1.9 ft/hr. In the exemplary operation, one tank is in decant or filled decant and the remaining three tanks are full (for example, two in react and one in settle) at the time of the switch from batch mode to continuous mode. The controller triggers the mode switch and opens all influent valves, such that the water level in each tank starts rising at 1.9 ft/hr. In just over 30 minutes at least two of the tanks will hit the emergency high level float (located one foot above the typical top water level) and will discharge very poor effluent. The third tank that was in settle will also hit the emergency float, but likely would not discharge poor effluent since there was already some elapsed settle time plus the extra 30 minutes filling to the emergency float level. If a polishing filter is downstream of the system, the dirty discharges will blind the filters with mixed liquor solids.

In an alternative embodiment, if the influent flow rate rises to 300% the tanks have 20 minutes to fill to the emergency level, which is not enough time to achieve adequate settling. At the design peak flow rate of 400% the filling from 18 to 19 ft occurs in 15 minutes. Thus, at any flow rate above about 150% of design, the system will discharge mixed liquor solids at a concentration that is a hundred times the permitted effluent quality. The discharge will continue until the storm flows subside.

Therefore, in order to insure adequate capacity to allow the system to provide adequate settle time prior to decanting, the reactors must be larger. An adequate capacity is provided with an additional volume of about 20% to 30%, with attendant cost. The additional 45-minute fill time provided by the additional volume will allow a second reactor to finish settle and begin decanting.

The systems disclosed herein recognize the volumetric limitations and implement operation control responsive to an anticipated flow rate. The anticipation generally provides sufficient time to begin the transition before the flow event reaches the reactors. This insures the operating mode switch will only be activated when a storm is expected and can therefore be initiated early when influent flow rates are still relatively low, but infrequently so that the process advantages of batch mode operation are not lost.

Additionally, the systems disclosed herein reject the simplistic "all tanks in batch or all tanks in continuous-fill" strategy in favor of a reactor-by-reactor transition decision which addresses the unique conditions in each reactor and acts to transition modes when appropriate for each reactor. This independent transition provides adequate treatment without requiring larger tanks. It is recognized that the time available will not always favor the immediate transition of a full tank to receive more flow. In some cases, one or two tanks must not receive additional flow until a process function is completed. The other tanks will operate to take up the additional flow.

Thus, the systems disclosed herein provide efficient treatment without requiring greater volume. The methods disclosed herein are efficient at treating wastewater during increased flow events such as storms.

The invention claimed is:

1. A method of treating wastewater with a sequencing batch reactor system having a plurality of reactors arranged in parallel, comprising:
   operating the plurality of the reactors in a batch flow mode;
   obtaining a first value for at least one flow rate parameter selected from expected rainfall, actual rainfall, and expected sewerage flow rate at a first period of time to determine a first anticipated flow rate of the wastewater at an inlet of the reactors;
   responsive to the first anticipated flow rate being determined to be greater than a flow rate tolerated by a design hydraulic loading rate of the reactors, selecting one or more reactor being determined to be in a state capable of receiving the wastewater in a continuous flow mode;
   operating the one or more selected reactor in the continuous flow mode; and
   repeating the selection of one or more remaining reactor operating in the batch flow mode being determined to be in the state capable of receiving wastewater in the continuous flow mode and operating each selected remaining reactor in the continuous flow mode until after a second period of time all reactors of the plurality of reactors are operating in the continuous flow mode.

2. The method of claim 1, wherein operating the reactor in the continuous flow mode comprises operating the reactor at a hydraulic loading rate of about 25% to about 50% of a hydraulic loading rate of the batch flow mode.

3. The method of claim 1, wherein selecting the one or more reactor being determined to be in the state capable of receiving the wastewater in the continuous flow mode comprises determining a current cycle period of the reactor and selecting the reactor responsive to the current cycle period of the reactor.

4. The method of claim 3, wherein selecting the one or more reactor being determined to be in the state capable of receiving the wastewater in the continuous flow mode comprises selecting the reactor based on the current cycle period being one of fill, decant, and idle.

5. The method of claim 1, wherein selecting the one or more reactor being determined to be in the state capable of receiving the wastewater in the continuous flow mode comprises measuring one or more parameter for each reactor selected from available fill volume, influent water composition, process water composition, and hydraulic loading rate, and selecting the one or more reactor responsive to the measured parameter.

6. The method of claim 1, wherein after all reactors of the plurality of reactors are operating in the continuous flow mode, the method further comprises:
   obtaining a second value for the at least one flow rate parameter selected from expected rainfall, actual rainfall, and expected sewerage flow rate at a third period of time to determine a second anticipated flow rate of the wastewater at the inlet of the reactors;
   responsive to the second anticipated flow rate being determined to be within the flow rate tolerated by the design hydraulic loading rate of the reactors, selecting one or more reactor being determined to be in a state capable of receiving wastewater in the batch flow mode;
   operating the one or more selected reactor in the batch flow mode; and
   repeating the selection of one or more remaining reactor operating in the continuous flow mode being determined to be in the state capable of receiving wastewater in the batch flow mode and operating each selected remaining reactor in the batch flow mode until after a fourth period of time all reactors of the plurality of reactors are operating in the batch flow mode.

7. The method of claim 1, wherein operating the one or more selected reactor in the continuous flow mode includes a transition period comprising react and settle cycle periods.

8. The method of claim 7, wherein an amount of time of the transition period is sufficient to settle an effective amount of contaminants.

9. The method of claim 8, wherein the anticipated flow rate at the first period of time is a flow rate expected after the amount of time of the transition period.

10. The method of claim 1, wherein an effective amount of aeration is introduced into the one or more reactor during the continuous flow mode.

11. The method of claim 1, wherein the first value is obtained for the expected rainfall and the expected rainfall is determined responsive to at least one of a predicted weather event, time of day, time of year, and geographic location.

12. The method of claim 1, wherein the first value is obtained for the expected sewerage flow rate and the expected sewerage flow rate is determined responsive to at least one of a predicted sewerage event, time of day, time of year, and geographic location.

13. A sequencing batch reactor system, comprising:
a plurality of reactors arranged in parallel, each of the reactors having an inlet fluidly connectable to a source of wastewater and an outlet;
a loading subsystem configured to control a hydraulic loading rate of wastewater into each of the reactors through the inlet;
a measuring subsystem configured to measure a parameter of each of the reactors and transmit an input signal corresponding to the measured parameter; and
a controller operably connected to the loading subsystem and the measuring subsystem,
the controller configured to receive and analyze the input signal and determine a state of each of the reactors,
the controller further configured to obtain a value for at least one flow rate parameter selected from expected rainfall, actual rainfall, and expected sewerage flow rate to determine an anticipated flow rate of the wastewater responsive to the value;
the controller further configured to transmit an output signal to the loading subsystem, the loading subsystem being configured to analyze the output signal to independently operate each of the reactors in a batch flow mode or in a continuous flow mode responsive to the state of each of the reactors and the anticipated flow rate of the wastewater.

14. The system of claim 13, wherein the controller is configured to transmit the output signal to operate one or more selected reactor in the continuous flow mode responsive to the anticipated flowrate of the wastewater being greater than a design hydraulic loading rate of the plurality of the reactors and the one or more selected reactor being in the state capable of receiving the wastewater in the continuous flow mode.

15. The system of claim 13, wherein the controller is operably connected to a rain sensor configured to transmit to the controller the value for the at least one flow rate parameter comprising a measurement for the actual rainfall.

16. The system of claim 13, wherein the controller is configured to obtain the value for the at least one flow rate parameter comprising at least one of the expected weather event and the expected sewerage event responsive to at least one of a predicted weather event, a predicted sewerage event, time of day, time of year, and geographic location.

17. The system of claim 16, wherein the controller is programmable to recognize trends of the anticipated flow rate on a schedule and transmit the output signal responsive to the recognized trends.

18. The system of claim 13, wherein the measuring subsystem comprises one or more of a flow meter, a pressure sensor, an oxidation-reduction potential sensor, a dissolved oxygen sensor, and a level sensor.

19. The system of claim 18, wherein the controller is configured to determine the state of each of the reactors based on at least one of available fill volume, influent water composition, process water composition, and hydraulic loading rate.

20. The system of claim 13, further comprising an equalization tank having an inlet fluidly connected to the outlet of each of the reactors.

21. The system of claim 13, further comprising at least one surge tank having an inlet fluidly connectable to the source of the wastewater and an outlet fluidly connected to the inlet of each of the reactors.

22. The system of claim 13, wherein each of the reactors has a second inlet fluidly connectable to a source of oxygen.

23. The system of claim 22, wherein the controller is further configured to introduce an effective amount of aeration during the continuous flow mode.

* * * * *